(12) United States Patent
St. Clair (10) Patent No.: US 7,200,800 B2
(45) Date of Patent: Apr. 3, 2007

(54) PLATFORM INDEPENDENT FILE MANIPULATION

(75) Inventor: Lawrence B. St. Clair, Lansing, MI (US)

(73) Assignee: Hewlett-Packard Development Company, L.P., Houston, TX (US)

(*) Notice: Subject to any disclaimer, the term of this patent is extended or adjusted under 35 U.S.C. 154(b) by 546 days.

(21) Appl. No.: 10/620,929

(22) Filed: Jul. 16, 2003

(65) Prior Publication Data

US 2005/0015697 A1    Jan. 20, 2005

(51) Int. Cl.
G06F 11/00 (2006.01)
G08C 25/00 (2006.01)
H03M 13/00 (2006.01)
H04L 1/00 (2006.01)

(52) U.S. Cl. .................... 714/799; 714/766
(58) Field of Classification Search .......... 714/799, 714/766

See application file for complete search history.

(56) References Cited

U.S. PATENT DOCUMENTS

| 5,421,017 | A  | * | 5/1995  | Scholz et al. ........... 717/170 |
| 5,528,750 | A  | * | 6/1996  | Lubart et al. ............ 714/15  |
| 5,923,885 | A  |   | 7/1999  | Johnson et al.                    |
| 6,269,480 | B1 |   | 7/2001  | Curtis                            |
| 6,460,178 | B1 | * | 10/2002 | Chan et al. ............. 717/147 |
| 6,804,816 | B1 | * | 10/2004 | Liu et al. ............... 719/311 |

* cited by examiner

*Primary Examiner*—Albert Decady
*Assistant Examiner*—Mujtaba Chaudry (57) ABSTRACT

In an exemplary described implementation, an electronic device is configured to perform operations that include: activate a platform dependent module that is targeted to run on a current platform of the electronic device; activate an error detection module for the current platform using the platform dependent module; retrieve an error detection scheme; apply the retrieved error detection scheme to received data to determine error detection data; compare the determined error detection data to received error detection data; and if the determined error detection data matches the received error detection data, provide at least one feature with respect to the received data. Other apparatus, method, arrangement, system, media, etc. implementations are described herein.

12 Claims, 6 Drawing Sheets

PLATFORM INDEPENDENT FILE MANIPULATION

BACKGROUND

A basic functional block of computers and other electronic devices is the file. Files can store information, be executed to perform a task or provide a service, both store information and be executed, and so forth. Frequently, files are created at a first location and then accessed at a second, distant location. Files can be transferred from the first location to the second location using transmission media such as the Internet or using storage media such as a CD-ROM, which may be physically carried to the second location or used as an archive media (e.g., for the first or second location).

With either file transference approach, problems correctly accessing the file at the second location can be experienced. For example, errors can be introduced into the file during transmission. These and other difficulties can prevent a user at the second location from correctly opening, executing, or otherwise accessing the file.

SUMMARY

In an exemplary described apparatus implementation, an electronic device is configured to perform operations that include: activate a platform dependent module that is targeted to run on a current platform of the electronic device; activate an error detection module for the current platform using the platform dependent module; retrieve an error detection scheme; apply the retrieved error detection scheme to received data to determine error detection data; compare the determined error detection data to received error detection data; and if the determined error detection data matches the received error detection data, provide at least one feature with respect to the received data.

In an exemplary described media implementation, one or more electronically-accessible media comprise a data transference package that includes: a data component having data; error detection data associated with the data; multiple platform dependent modules, each platform dependent module of the multiple platform dependent modules capable of running on a different platform, the multiple platform dependent modules adapted to process the data; an error detection selection module that holds a selected error detection scheme; at least one error detection module capable of running on a targeted platform and adapted to effectuate at least the selected error detection scheme with respect to the data, the at least one error detection module activated by a platform dependent module of the multiple platform dependent modules that is capable of running on the targeted platform; and a transference success module capable of running on the targeted platform and adapted to provide at least one feature with respect to the data.

Other apparatus, method, arrangement, system, media, etc. implementations are described herein.

BRIEF DESCRIPTION OF THE DRAWINGS

In the Drawings, like numerals are used for like and/or corresponding blocks, items, aspects, and functions of the various FIGS. 1–6.

DETAILED DESCRIPTION

Figure 1:
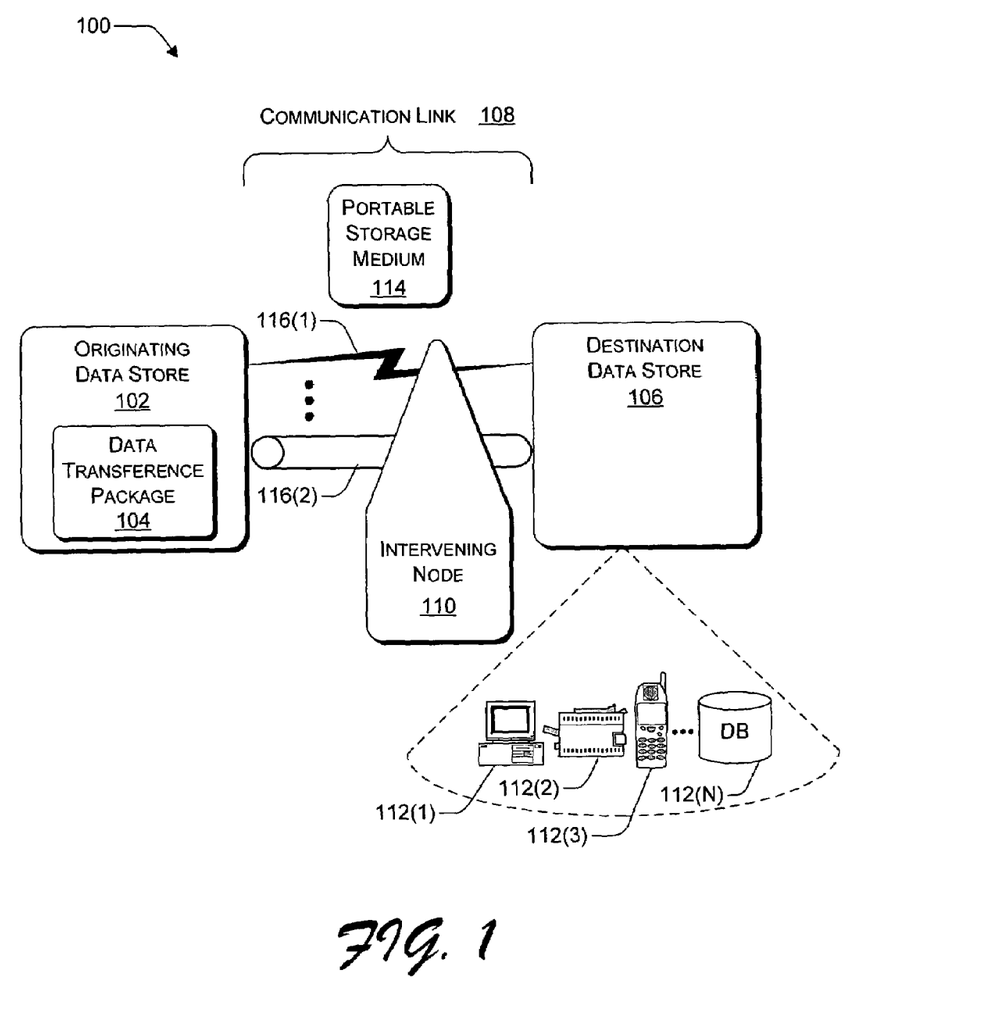
FIG. 1 illustrates an exemplary environment in which one or more implementations of the present invention may be practiced.

FIG. 1 illustrates an exemplary environment 100 in which one or more implementations of the present invention may be practiced. Environment 100 includes an originating data store 102 that stores a data transference package 104 that is to be transferred to destination data store 106. Data transference package 104 includes multiple modules that enable a file thereof to be manipulated across multiple platforms. Exemplary data transference packages 104 are described further below with reference to FIGS. 3 and 4.

Originating data store 102 and destination data store 106 comprise one or more media and/or one or more electronic devices that are capable of storing data transference package 104. More specifically, originating data store 102 is capable of producing, storing, and/or transmitting a data transference package 104, and destination data store 106 is capable of receiving, storing, and/or using a data transference package 104.

Each of originating data store 102 and destination data store 106 may comprise one or more of a network, a server/client computer, a laptop/desktop/palmtop/tablet computer, a printer or multifunction device, a game console or other entertainment device, a storage medium, a personal digital assistant (PDA), and so forth. Specific examples of data stores 102 and 106 are illustrated as a computer 112(1), a printer 112(2), a mobile phone 112(3), a database 112(N), and so forth. However, alternative embodiments for originating data store 102 and/or destination data store 106 may be used to implement one or more aspects of the present invention. An exemplary general electronic device embodiment is described further below with reference to FIG. 2.

Data transference package 104 is transferred (e.g., moved, copied, downloaded, etc.) from originating data store 102 to destination data store 106 using one or more communication links 108. Communication link 108 may be effectuated using a portable storage medium (or media) 114 that stores data transference package 104 and that may be physically transferred to destination data store 106. Communication link 108 may also be realized using one or more transmission media 116, such as wired link 116(2) and wireless link 116(1). Media 114 and 116 may be optical, electromagnetic, etc. in nature.

Communication link 108 may also include one or more intervening nodes 110 that facilitate transference of data transference package 104 from originating data store 102 to destination data store 106. Intervening node 110 may be another computer, another network, a satellite, and so forth. Communication link 108 may be adapted to use any transport protocol including, but not limited to, a file transport protocol (FTP), an Ethernet protocol, a wireless standard protocol, and so forth.

Hence, environment 100 enables originating data store 102, which produces or otherwise has access to data transference package 104, to transfer or to cause to be transferred data transference package 104 to destination data store 106 via communication link(s) 108. However, during the production and/or transfer of a file of data transference package 104, errors can develop. Also, originating data store 102 and destination data store 106 may be operating under any of many different possible platforms.

Figure 2:
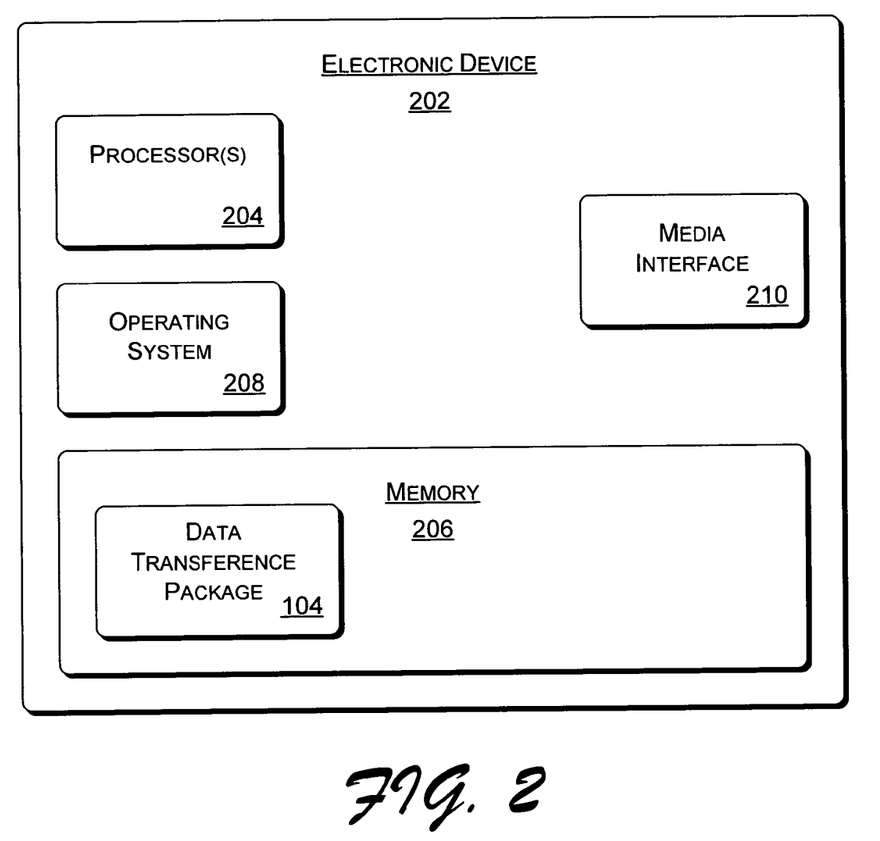
FIG. 2 is an exemplary electronic device that may be used for one or more implementations of the present invention.

FIG. 2 is an exemplary electronic device 202 that may be used for one or more implementations of the present invention. For example, electronic device 202 may be used to implement an originating data store 102 and/or a destination data store 106. In a described implementation, electronic device 202 comprises a computer such as a desktop computer.

Electronic device 202 includes at least one operating system 208, one or more processors 204, one or more memories 206, and at least one media interface 210. Memory 206 includes a data transference package 104 at least prior to transmission (for an originating data store 102 implementation) and at least after reception (for a destination data store 106 implementation). Memory 206 may also store electronically-executable instructions for operating system 208 before, during, and after execution thereof.

Processor(s) 204 are capable of processing various electronically-executable instructions to control the operation of electronic device 202 and to communicate with other electronic devices, including another data store 102 or 106. Such instructions include those instructions of operating system 208 and those of data transference package 104. Operating system 208 may comprise one or more operating systems (OSs) including, but not limited to, a Microsoft® Windows® OS, an Apple® Corporation OS, a Unix™ OS, a "Linux" OS, and so forth. It should be noted that set-top boxes, mobile phones, PDAs, etc. typically use operating systems, too. For example, some mobile phones use a Symbian™ OS, some set-top boxes use a General Instruments (GI)-type OS, and some PDAs use a Palm® OS.

In an exemplary computer (or other electronic device) implementation, the OS in use reflects the platform with which code may be designed to interact at a device level. In an exemplary network or system implementation, the computing environment in use reflects the platform with which code may be designed to interact. In general, an operating paradigm for an originating data store 102 and/or a destination data store 106 reflects a current platform for the originating data store 102 and/or the destination data store 106, respectively.

Media interface 210 is capable of interfacing with storage media and/or transmission media. Transmission media examples include wireless link 116(1) (of FIG. 1), wired link 116(2), network-type connections, directly-cabled connections between a computer and a peripheral, an internal or local-scale bus-type connection, etc. as described above for transmission media 116. Storage media examples include portable storage medium 114 (of FIG. 1), memory 206, and so forth.

Memory 206 is an example of a storage medium at an originating data store 102 and/or a destination data store 106. Memory 206 may be realized as random access memory (RAM), flash memory, programmable read-only memory (PROM), read-only (non-erasable) memory (ROM), electrically programmable read-only memory (EPROM), electrically erasable programmable read-only memory (EEPROM), some other non-volatile (e.g., solid state) memory, a mass memory such as a hard disk or array of disks, an optical or magneto-optical memory format (writable and/or rewritable), a floppy disk, some combination thereof, and so forth. Any of these memory types may be integrated with or removably coupled to electronic device 202.

Figure 3:
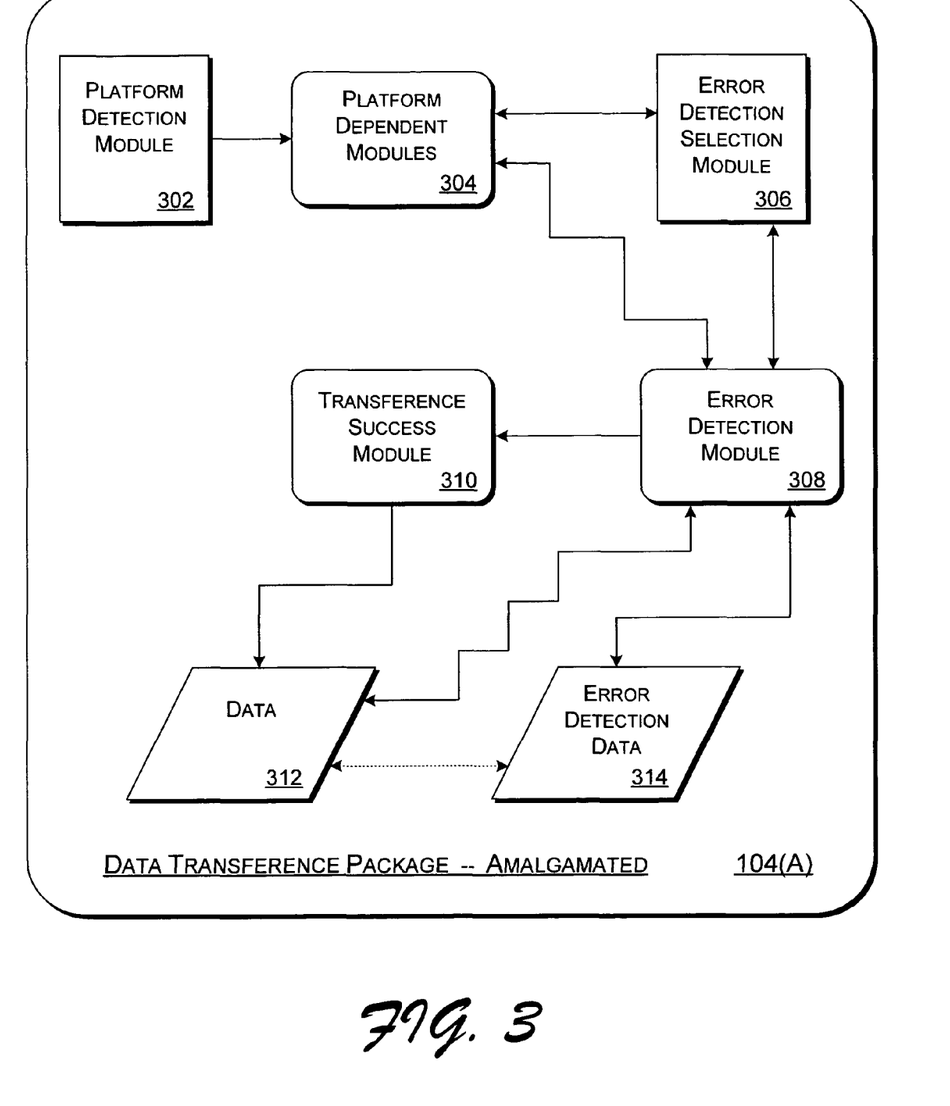
FIG. 3 is an exemplary data transference package that is illustrated in an amalgamated format in accordance with one or more implementations of the present invention.

FIG. 3 is an exemplary data transference package 104(A) that is illustrated in an amalgamated format in accordance with one or more implementations of the present invention. Data transference package 104(A) includes seven (7) logical blocks 302–314.

These seven logical blocks include: platform detection module 302, platform dependent modules 304, error detection selection module 306, error detection module 308, transference success module 310, data 312, and error detection data 314. In a described implementation, modules 302, 304, 306, 308, and 310 are adapted to manipulate at least one file as represented by data 312 in order to enable a user to access the file as intended. Modules 302, 304, 306, 308, and 310 represent code that can be executed at a destination data store 106 after receiving data transference package 104(A).

Platform detection module 302 is one or more modules that are platform independent. As such, platform detection module 302 is capable of being executed on multiple predetermined (but expandable) platforms. Specifically, platform detection module 302 is adapted to detect the platform on which data transference package 104(A) is currently running.

The entirety of data transference package 104(A) and/or the individual platform detection module(s) 302 may act as the data transference shell that is first executed on a destination data store 106. As such, it may be preferable to carefully name such a data transference shell in accordance with the preferences of any desired target platforms. For example, a platform that corresponds to certain Microsoft® Windows® operating systems may expect a ".exe" extension on modules that are executable.

After platform detection module 302 detects the current platform, it activates a platform dependent module from platform dependent modules 304 that corresponds to the detected platform, which is termed herein the current platform module. Platform dependent modules 304 is platform independent as a group, but the individual modules of platform dependent modules 304 are platform dependent and may be activated individually by platform detection module 302.

The platform dependent module of platform dependent modules 304 that corresponds to the detected platform, or the current platform module, is thus activated by platform detection module 302. This current platform module is adapted to execute on the current platform and to process data 312 into a form that is valuable (e.g., viewable, executable, playable, or otherwise accessible) to the user. Such processing may include, for example, the coordination of error checking and/or file extraction.

To determine whether the processing includes error checking, the current platform module consults error detection selection module 306 to retrieve the selected error detection scheme therefrom. Error detection selection module 306 holds any selected error detection scheme for data 312. If no error detection scheme has been selected, then error checking with respect to error detection module 308 may be omitted. Otherwise, the current platform module passes control to or otherwise activates error detection module 308 to effectuate the selected error detection scheme.

Error detection module 308 also consults error detection selection module 306 to retrieve the selected error detection scheme therefrom. After retrieving the selected error detection scheme, error detection module 308 is capable of performing an error check on data 312 using error detection data 314 by effectuating the selected error detection scheme as described further below.

It should be understood that the logical blocks of FIG. 3 (and FIG. 4) may be rearranged, combined, augmented, etc. when creating a data transference package 104 in accordance with implementations of the present invention. For example, instead of retrieving the selected error detection scheme from error detection selection module 306 directly, error detection module 308 may alternatively receive the selected error detection scheme from the current platform module of platform dependent modules 304. As another alternative, the current platform module may automatically pass control to error detection module 308 to permit error detection module 308 to determine whether any error checking is to be effectuated by consulting error detection selection module 306.

Furthermore, although platform dependent modules 304 are described primarily as being a collection of modules, and error detection module 308 is described primarily as being (at least) one module (with possibly multiple portions), this is for clarity only. Such terminology is more a matter of semantic characterization than a reflection of logical or functional organization. Thus, they may alternatively be considered and/or characterized as platform dependent module 304 and error detection modules 308, respectively.

In a described implementation, error detection selection module 306 is platform independent. As described above, error detection selection module 306 holds the selected error detection scheme. This selected error detection scheme comprises one or more of any error detection schemes that may be effectuated by an electronic device. Examples include, without limitation, a cyclic redundancy check (CRC) scheme, a sender verification scheme (e.g., using a Hamming code), a parity check scheme, and so forth.

When the selected error detection scheme is applied to data 312, one or more resulting values are produced. With CRC for example, a relatively large number or a relatively small number may be produced. Also, more than one algorithm and/or scheme may be applied to different parts of data 312 to produce more than one value. The resulting value(s) is(are) held at error detection data 314. Hence, error detection selection module 306 indicates how error detection data 314 is to be interpreted by error detection module 308.

Error detection module 308 is platform dependent inasmuch as it executes using platform-specific coding. Platform detection module 302 and/or the current platform module of platform dependent modules 304 identifies for activation the appropriate platform-corresponding error detection module 308 from among multiple error detection modules. Error detection module 308 is capable of applying one or more error detection schemes to files such as data 312. Error detection module 308 is adapted to effectuate the selected error detection scheme(s) as retrieved from error detection selection module 306 by applying the selected error detection scheme to data 312 to determine error detection data.

Data 312 and error detection data 314 may be platform independent, especially if they comprise binary blobs that are not executable either during transference or prior to processing. Error detection module 308 retrieves error detection data 314 and compares it to the determined error detection data. If they are not equal, then the data processing may be stopped and the user may be notified at the destination data store 106 that the received file is corrupted. Destination data store 106 may also optionally notify originating data store 102 that the intended transfer failed. Alternatively, when error detection data 314 is not equal to the determined error detection data, the data processing may be continued if the error does not (e.g., fatally) corrupt data 312 and/or if the error can be corrected.

If, on the other hand, the determined error detection data is equal to error detection data 314, data 312 may be considered error-free and the transference may be considered successful. If data transference package 104(A) includes one or more other error checks, the error check with respect to error detection data 314 is the large-scale, initial, or primary error check. However, other features may be provided by transference success module 310. Such other features may include a small-scale, subsequent, or secondary error check.

If other features are to be provided with respect to data 312, error detection module 308 passes control to or otherwise activates transference success module 310. Transference success module 310 is also platform dependent inasmuch as it executes using platform-specific coding. Generally, transference success module 310, when present, is adapted to provide one or more features for a user with respect to data 312.

Any given transference success module 310 may be capable of providing one or more of the exemplary features that are described herein. As noted above, a small-scale, subsequent, or secondary error check may be performed on data 312. This error check feature may also be general in nature or it may alternatively be directed to verify that data 312 is usable for its intended purpose. For example, transference success module 310 may verify that information of data 312 correctly meshes with other pre-existing information, that an executable file of data 312 is capable of executing successfully and/or without interfering with a pre-existing state or setup of destination data store 106.

A transference success module 310 may also be capable of addressing an error (e.g., a lack of success) that is detected by transference success module 310 as part of an error check feature or that is detected by error detection module 308 using a selected error detection scheme. For example, transference success module 310 may attempt to ensure that the error does not cause a fatal corruption to data 312 and/or attempt to remedy (e.g., fix or otherwise recover from) the error, such as by using built-in redundant information.

As another exemplary feature, transference success module 310 may be capable of checking that certain fields or other portions of information of data 312 are equivalent to an expected value. Such expected values and/or other error checking data may be stored at transference success module 310 or another component of data transference package 104 such as error detection data 314. Thus, the dashed arrow that connects data 312 and error detection data 314 indicates another optional linkage between the two that may be utilized by transference success module 310. As an example of a feature for checking an equivalency to an expected value, transference success module 310 can verify that each designated field of a spreadsheet file is equal to a certain value and/or includes two decimal places.

Other exemplary features include installation and/or retransmission of the file of data 312. For example, transference success module 310 may be capable of installing (e.g., on the current platform) a file of data 312. Furthermore, transference success module 310 may be capable of retransmitting the file of data 312 (with or without using and/or recreating the overall data transference package 104) to another destination data store 106 and/or back to originating data store 102.

Additionally, transference success module 310 may be capable of providing (i) decryption (and/or encryption) features and/or (ii) decompression (and/or compression) features. For example, transference success module 310 may decrypt and decompress a file of data 312 prior to providing full access to the file to a user.

As yet another exemplary feature, transference success module 310 may be capable of altering (e.g., changing, modifying, etc.) information of data 312. For example, after any applicable decryption and decompression of data 312, the content thereof may be reformatted and/or converted. As a specific conversion example, a spreadsheet that lists financial amounts in a first currency may be presented to users at a destination data store 106 with the financial amounts listed in a second currency. Language conversion, page/paragraph formatting, etc. may also be provided. In conjunction with or separately from such altering, transference success module 310 may execute code in another runtime environment, such as a billing program.

Figure 4:
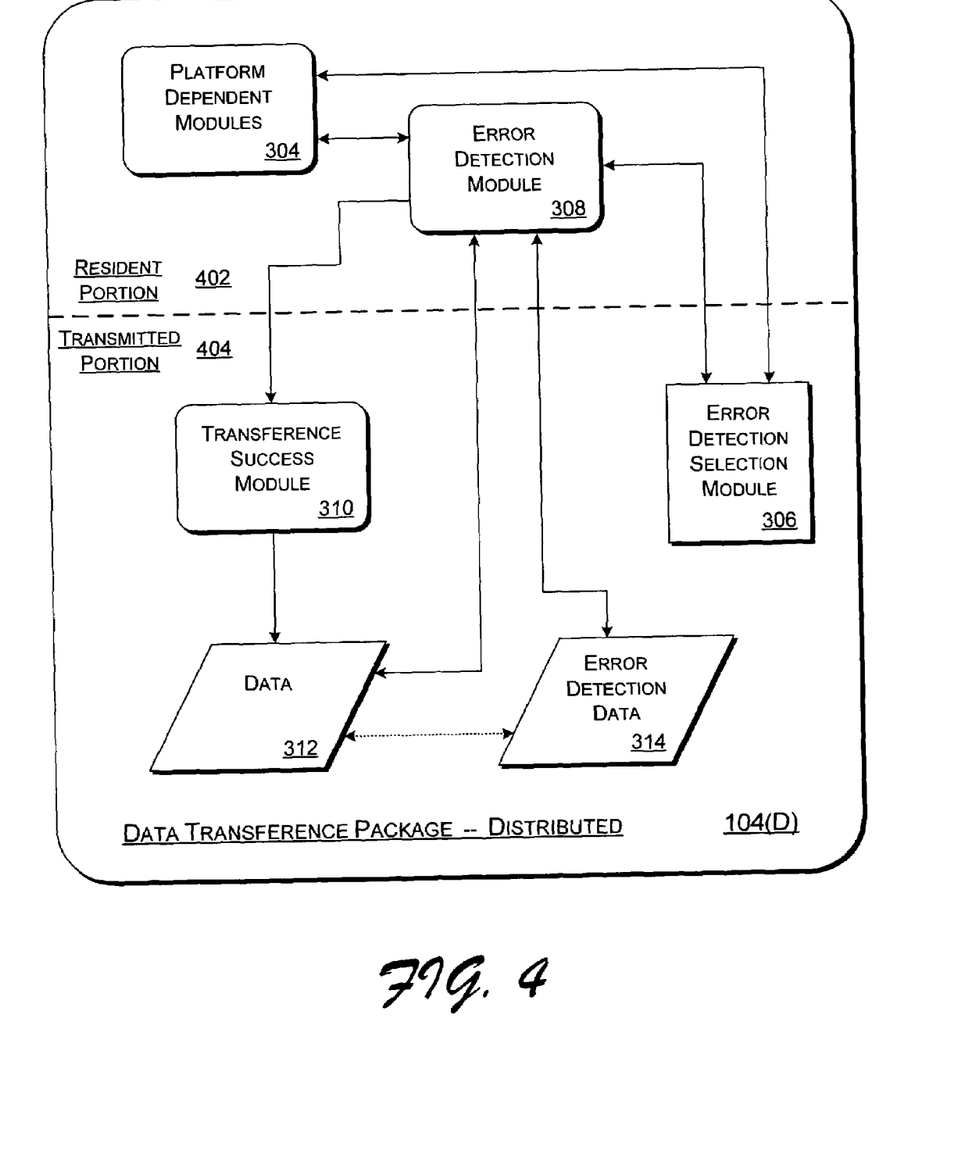
FIG. 4 is an exemplary data transference package that is illustrated in a distributed format in accordance with one or more implementations of the present invention.

FIG. 4 is an exemplary data transference package 104(D) that is illustrated in a distributed format in accordance with one or more implementations of the present invention. Data transference package 104(A) (of FIG. 3) in the implementation described above can be bundled together. In contradistinction, data transference package 104(D) is separated into two or more portions.

Specifically, data transference package 104(D) is divided into two portions: a resident portion 402 and a transmitted (or transferred) portion 404. Resident portion 402 includes platform dependent modules 304 and error detection module 308. Transmitted portion 404 includes error detection selection module 306, transference success module 310, data 312, and error detection data 314. It should be noted that transference success module 310 may alternatively be part of resident portion 402, such as when installing a ring tone on a mobile phone 112(3).

The modules of resident portion 402 are previously supplied to destination data store 106. Thereafter, the modules of resident portion 402 reside at destination data store 106 until there are needed by, for example, the arrival of a transmitted portion 404.

The modules of resident portion 402 may be previously supplied to destination data store 106 via communication link 108 or any other manner. A platform detection module 302 is not illustrated in data transference package 104(D) because it is optional inasmuch as once platform dependent modules 304 and error detection module 308 are installed at a given destination data store 106, the platform thereof is intrinsically known thereafter. Hence, during such an initial installation, platform detection module 302 can be used or the platform can be manually provided.

Furthermore, platform dependent modules 304 and error detection module 308 need not retain modules to run on all originally-targeted platforms once the platform of destination data store 106 on which they reside is initially established. If only the modules for the current platform are retained and the modules for other platforms are jettisoned, memory usage at destination data store 106 is reduced. However, if all modules of platform dependent modules 304 and error detection module 308 are retained at destination data store 106, the resulting flexibility is greater. For example, by maintaining modules for other targeted platforms, destination data store 106 is capable of forwarding a data transference package 104(A) (amalgamated) to downstream destination data store(s) 106 that operate under a different platform and that do not have any modules resident thereat.

With a data transference package 104(D) (distributed), an originating data store 102 may omit platform dependent modules 304 and error detection module 308 while sending the components of transmitted portion 404. This reduces transmission bandwidth requirements. It should be noted that the components of resident portion 402 may be updated as desired either manually at destination data store 106 or remotely via a communication link 108 or similar.

Applications implementing platform independent file manipulation may be described in the general context of electronically-executable instructions, as alluded to above with reference to FIGS. 2–4. Generally, electronically-executable instructions include routines, programs, objects, components, data structures, and the like that perform particular functions or implement particular abstract data types. Implementing platform independent file manipulation as described herein may also be effectuated in distributed environments where functions are performed by processing and/or media components that are remote from one another but connected through a communications link or otherwise coupled thereto. Especially in such distributed environments, electronically-executable instructions may be located in both local and remote storage media, as well as in signals that are extant on one or more transmission media.

Figure 5:
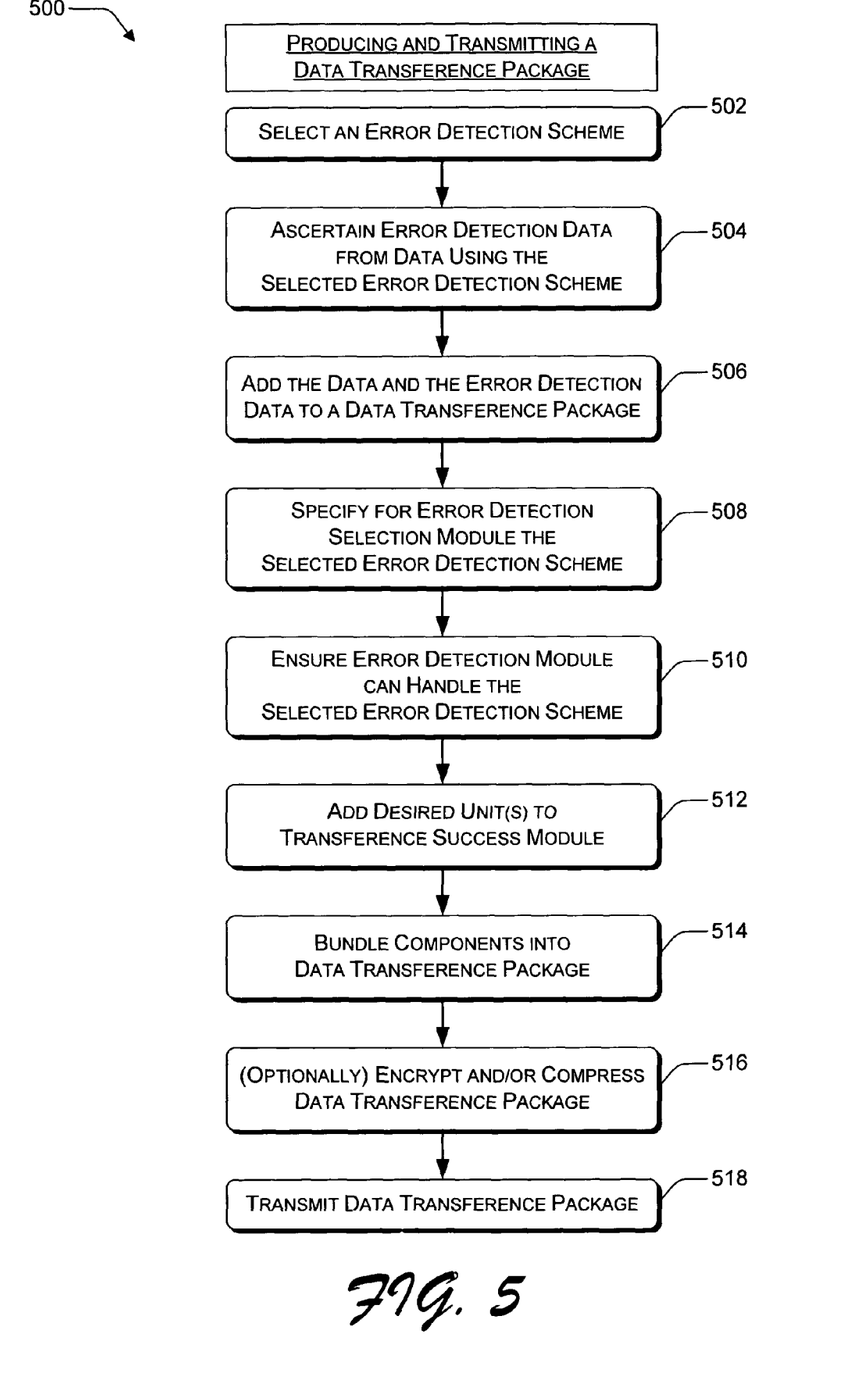
FIG. 5 is a flow diagram that illustrates an exemplary method for producing and transmitting a data transference package in accordance with one or more implementations of the present invention.
Figure 6:
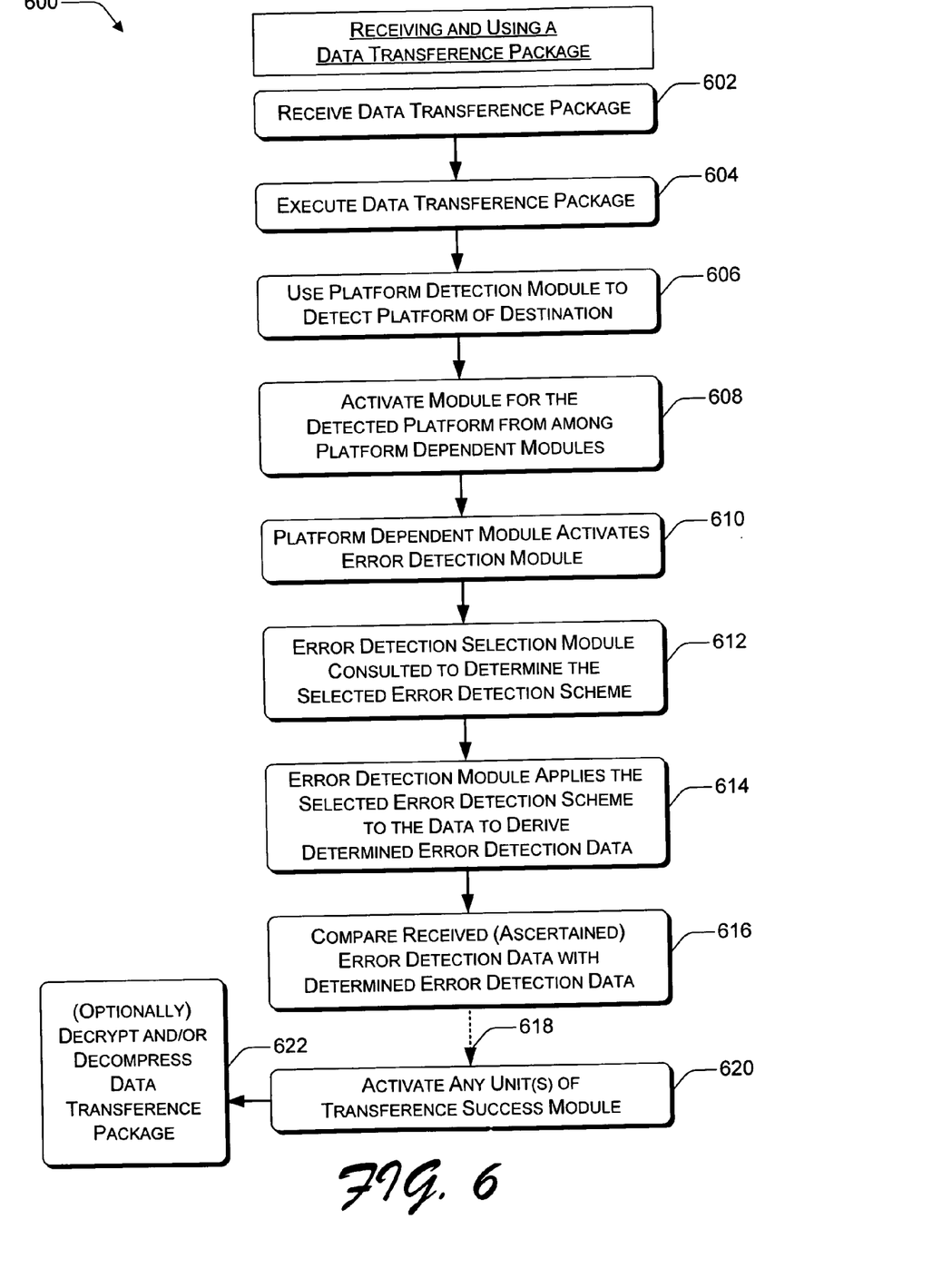
FIG. 6 is a flow diagram that illustrates an exemplary method for receiving and using a data transference package in accordance with one or more implementations of the present invention.

The methods of FIGS. 5 and 6 are illustrated in flow diagrams that are divided into multiple blocks. However, the order in which the methods are described below is not intended to be construed as a limitation, and any number of the described method blocks can be combined in any order to perform one or more methods for platform independent file manipulation. The action(s) for any method block may also be performed fully or partially simultaneously with those of any other block or blocks. Furthermore, although the methods of FIGS. 5 and 6 are described below with reference to data transference package 104 (of FIGS. 3 and 4) and FIGS. 1 and 2 where applicable, the methods can be implemented in any suitable hardware, software, firmware, or combination thereof and using any appropriate media and/or any suitable environment.

FIG. 5 is a flow diagram 500 that illustrates an exemplary method for producing and transmitting a data transference package 104 in accordance with one or more implementations of the present invention. Flow diagram 500 includes nine (9) blocks 502–518. Flow diagram 500 is described below primarily in the context of an amalgamated data transference package 104(A), but it may be modified for a distributed data transference package 104(D).

Any or all of the actions for blocks 502–518 may occur at, and be performed by, an originating data store 102. Alternatively, any or all of the actions for blocks 502–516 may be performed elsewhere with the action(s) of block 518 being performed at and by an originating data store 102.

At block 502, an error detection scheme is selected. For example, a CRC scheme may be selected by a user, by an originating data store 102 responsive to a predefined protocol, by an originating data store 102 responsive to randomizing parameters, and so forth. At block 504, error detection data is ascertained from data using the selected error detection scheme. For example, the CRC scheme may be applied to a file of data 312 to ascertain a CRC-based checksum for error detection data 314.

At block 506, the data and the error detection data are added to a data transference package. For example, the file of data 312 and the CRC-based checksum for error detection data 314 may be added to a data transference package 104(A). At block 508, the selected error detection scheme is specified for an error detection selection module. For example, the selected error detection scheme of CRC may be specified and included in an error detection selection module 306.

At block 510, it is ensured that an error detection module can handle the selected error detection scheme. For example, it may be verified that each error detection module of error detection modules 308 for each targeted platform is capable of applying at least the selected CRC scheme of error detection selection module 306 to the file of data 312. If an error detection module for a targeted platform is discovered to be incapable of applying the selected error detection scheme, then that error detection module is augmented or swapped to ensure that it can handle the selected error detection scheme.

At block 512, one or more desired units (if any) are added to a transference success module. For example, for each desired feature to be provided by a transference success module 310, a corresponding unit may be added thereto. It should be noted that a single unit of transference success module 310 may be capable of providing more than one feature.

At block 514, the components are bundled into the data transference package. For example, the modules 302, 304, 306, 308, and 310, along with data 312 and error detection data 314, may be bundled into data transference package 104(A).

At block 516, encryption and/or compression is performed on the data transference package. Either, neither, or both operations may be performed at block 516. For example, the entirety of data transference package 104(A) may be compressed and then encrypted, or vice versa. Alternatively (or additionally), the file of data 312 may be compressed and then encrypted, or vice versa. In either case, transference success module 310 or another program that is not a component of data transference package 104(A) may perform the encryption and/or compression.

At block 518, the data transference package is transmitted. For example, data transference package 104(A) may be transmitted from originating data store 102 to destination data store 106 via a communication link 108 such as transmission media 116. More generally, data transference package 104(A) may be transferred from originating data store 102 to destination data store 106 via any communication link 108.

In an alternative implementation for FIG. 5, a method thereof is performed in the context of a distributed data transference package 104(D). In such an implementation, the actions of block 510 may be performed in a number of manners. First, the error detection scheme selected at block 502 may be or have been selected or may be reselected in view of those error detection schemes that are known to be supported by deployed error detection modules 308 that are resident at destination data stores 106. Second, error detection modules 308 that are resident at destination data stores 106 may be updated if necessary responsive to the selected error detection scheme. This update may occur prior to or along with the transmission at block 518; also, the update may optionally be included as part of data transference package 104(D).

In this distributed data transference package 104(D) context, the bundling of block 514 may be accomplished without including platform dependent modules 304 or error detection module 308. Consequently, the transmission action of block 518 includes the components of transmitted portion 404 but excludes those of resident portion 402.

FIG. 6 is a flow diagram 600 that illustrates an exemplary method for receiving and using a data transference package 104 in accordance with one or more implementations of the present invention. Flow diagram 600 includes ten (10) blocks 602–616, 620, and 622.

Flow diagram 600 is described below primarily in the context of an amalgamated data transference package 104(A), but it may be modified for a distributed data transference package 104(D). In a described implementation, the actions for blocks 602–616, 620, and 622 occur at, and are performed by, a destination data store 106.

At block 602, a data transference package is received. In a described implementation, the received data transference package corresponds to the data transference package that is produced and transmitted in flow diagram 500 (of FIG. 5). For example, amalgamated data transference package 104(A) may be received at a destination data store 106 via one or more communication links 108.

At block 604, the data transference package is executed. For example, a user may click on or otherwise instigate execution of an executable shell of data transference package 104(A). Alternatively, execution of the executable shell of data transference package 104(A) may be instigated remotely, e.g., by a network administrator, by a user at originating data store 102, and so forth. Furthermore, execution may be instigated automatically as a result of receiving data transference package 104(A) or as a result of a periodic event (e.g., a scheduled task in Microsoft® Windows®, a cron job in Unix™, etc.). The execution of the executable shell of data transference package 104(A) may also be instigated by a third party software program at destination data store 106. Other options may also be utilized.

At block 606, a platform detection module is used to detect the platform of the destination data store. For example, platform detection module 302 may detect the current platform of destination data store 106. At block 608, the module for the detected platform from among multiple platform dependent modules is activated. For example, platform detection module 302 may activate the current platform module of platform dependent modules 304.

At block 610, the activated platform dependent module in turn activates an error detection module that corresponds to the detected platform from among multiple error detection modules. For example, the current platform module may activate an error detection module that corresponds to the current platform from among those of error detection module 308.

At block 612, an error detection selection module is consulted to determine the selected error detection scheme. For example, the current platform module from platform dependent modules 304 and/or the activated error detection module 308 may consult error detection selection module 306 in order to retrieve the selected error detection scheme, such as a CRC scheme. This action may be performed by the current platform module prior to the actions of block 610. If so, the current platform module may optionally provide the selected error detection scheme to the activated error detection module 308 during the action(s) of block 610.

At block 614, the error detection module applies the selected error detection scheme to the data to derive determined error detection data. For example, the activated error detection module 308 may apply the selected CRC scheme to the file of data 312 to derive determined error detection data, such as a determined CRC checksum.

At block 616, the received error detection data is compared to the determined error detection data. (In a described implementation, the received error detection data is previously ascertained at block 504 (of FIG. 5).) For example, the received error detection data may be retrieved from error detection data 314. This received and retrieved CRC checksum may be compared to the determined CRC checksum to detect whether they match.

If the received error detection data does not match the determined error detection data, an error has been detected and the transmitted file of the data transference package may be declared corrupt. If, on the other hand, the received error detection data does match the determined error detection data, then flow diagram 600 continues as indicated by dashed arrow 618. In other words, processing of the file of data 312 may continue if the received/retrieved CRC checksum matches the determined CRC checksum.

At block 620, any units of a transference success module are activated. For example, the error detection module 308 that detected or confirmed the absence of errors in the file of data 312 may activate transference success module 310. Each unit of transference success module 310 corresponds to one or more features that may be provided by transference success module 310. These one or more features are provided by the activated transference success module 310. Exemplary features are described above with particular reference to FIG. 3.

At block 622, decryption and/or decompression is performed on the data transference package. Either, neither, or both operations may be performed at block 622. For example, the entirety of data transference package 104(A) may be decompressed and then decrypted, or vice versa. Alternatively (or additionally), the file of data 312 may be decompressed and then decrypted, or vice versa. In either case, transference success module 310 or another program that is not a component of data transference package 104(A) may perform the decryption and/or decompression.

Also, the action(s) of block 622 may be performed earlier in the processing of the file of data 312. For example, decompression and/or decryption may be performed prior to a primary error checking (e.g., prior to the actions of at least blocks 614 and 616), after a primary error checking but prior to a secondary error checking, and so forth.

In an alternative implementation for FIG. 6, a method thereof is performed in the context of a distributed data transference package 104(D). In such an implementation, at least the actions of blocks 610, 612, and 614 may be fully or partially performed by component(s) of resident portion 402 (of FIG. 4). Also, the data transference package that is received in the action(s) of block 602 may include the components of transmitted portion 404 while lacking the components of resident portion 402. Furthermore, the action(s) of block 606 (and possibly those of block 608) may not be performed.

Although implementation(s) of apparatuses, methods, systems, media, and arrangements have been illustrated in the accompanying Drawings and described in the foregoing Detailed Description, it will be understood that the present invention is not limited to the implementation(s) explicitly disclosed, but is capable of numerous rearrangements, modifications, substitutions, etc. without departing from the spirit and scope set forth and defined by the following claims.

What is claimed is:

1. A computing device, comprising:
   a memory for storing data and error detection data associated with the data; and
   a processor coupled to the memory, wherein the processor executes:
   a plurality of platform dependent modules, each platform dependent module-capable of running on a different platform and processing the data,
   a platform detection module to (1) detect a targeted platform on which a data transference package is running and (2) activate one of the plurality of platform dependent modules to run on the targeted platform,
   an error detection selection module that holds a selected error detection scheme, and
   an error detection module running on the targeted platform to activate the selected error detection scheme with respect to the data, wherein the targeted platform includes at least one of a targeted operating system (OS) and a targeted computing environment.

2. The computing device of claim 1, wherein the data comprises a file that executes on the targeted platform.

3. The computing device of claim 1, wherein the data transference package comprises an amalgamated data transference package; and wherein the data, the error detection data, the plurality of platform dependent modules, the error detection selection module, the error detection module, and the transference success module are bundled together.

4. The computing device of claim 1, wherein the data transference package comprises a distributed data transference package; and wherein the plurality of platform dependent modules and the error detection module reside at a destination data store, while the data, the error detection data, the error detection selection module, and the transference success module are bundled together and extant at an originating data store and/or on a communication link.

5. The computing device of claim 1, wherein the error detection module is further adapted to effectuate the selected error detection scheme with respect to the data by being adapted (i) to apply the selected error detection scheme to the data to produce at least one value and (ii) to compare the at least one value to the error detection data.

6. The computing device of claim 1, wherein the plurality of platform dependent modules comprises a collective platform dependent module, and wherein the error detection module comprises a plurality of error detection modules.

7. The computing device of claim 1, wherein the platform detection module is further adapted to activate the platform dependent module of the plurality of platform dependent modules that is capable of running on the targeted platform.

8. The computer of claim 1, wherein the processor further executes: a transference success module running on the targeted platform and verifying the data is executable and not corrupt.

9. The computing device of claim 8, wherein the transference success module provide at least one of: a secondary error check; an equivalency checking with reference to an expected value; installation of a file of the data; retransmission of the file of the data; encryption of the data and/or the data transference package; decryption of the data and/or the data transference package; compression of the data and/or the data transference package; decompression of the data and/or the data transference package; a changing or modifying of information of the data; and an addressing of an error of the data component to ensure that the data is not fatally corrupted and/or to remedy the error.

10. A computer comprising:
data;
error detection data;
indication means for indicating an error detection scheme;
detection means for detecting a current platform;
processing means for processing the data while running on the current platform; error detection means for detecting an error in the data using the error detection scheme and the error detection data, the error detection means activated by the processing means; and
providing means for executing or manipulating the data if the error detection means does not detect an error in the data, wherein the providing means comprises one or more of: secondary checking means for performing a secondary error check; equivalency checking means for performing an equivalency check with respect to information of the data and with reference to an expected value; installation means for installing a file of the data; retransmission means for retransmitting the file of the data; cryptographic means for encrypting and/or decrypting the data; compression/decompression means for compressing and/or decompressing the data; and alteration means for altering the information of the data.

11. The computer as recited in claim 10, wherein the arrangement comprises at least one of (i) an electronic device and (ii) one or more electronically-accessible media comprising electronically-executable instructions.

12. A computer, comprising:
a processor coupled to a memory storing a data component and error detection data associated with the data component, wherein the processor executes:
a platform detection component adapted to detect a current platform,
an error detection selection component holding a selected error detection scheme,
a plurality of modules capable of running on at least two different platforms, each module of the plurality of modules adapted to apply the selected error detection scheme on the data component to detect errors; at least one module of the plurality of modules activated by the platform detection component, the at least one module being activated to run on the current platform, and
a transference success module capable of running on the current platform and adapted to execute or manipulate contents of the data component, wherein the plurality of modules include a plurality of platform dependent modules that may be activated by the platform detection component and a plurality of error detection modules that are adapted to apply the selected error detection scheme on the data component to detect errors.

* * * * *

UNITED STATES PATENT AND TRADEMARK OFFICE
CERTIFICATE OF CORRECTION

PATENT NO. : 7,200,800 B2 Page 1 of 1
APPLICATION NO. : 10/620929
DATED : April 3, 2007
INVENTOR(S) : Lawrence B. St. Clair It is certified that error appears in the above-identified patent and that said Letters Patent is hereby corrected as shown below:

In column 12, line 57, in Claim 9, delete "provide" and insert -- provides --, therefor.

Signed and Sealed this

Ninth Day of September, 2008

JON W. DUDAS
*Director of the United States Patent and Trademark Office*